US012804564B2

(12) United States Patent
Gao

(10) Patent No.: US 12,804,564 B2
(45) Date of Patent: Nov. 17, 2026

(54) SRS POWER CONTROL METHOD AND APPARATUS, AND STORAGE MEDIUM

(71) Applicant: Beijing Xiaomi Mobile Software Co., Ltd., Beijing (CN)

(72) Inventor: Xueyuan Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 245 days.

(21) Appl. No.: 18/715,208

(22) PCT Filed: Dec. 3, 2021

(86) PCT No.: PCT/CN2021/135543

§ 371 (c)(1),
(2) Date: May 31, 2024

(87) PCT Pub. No.: WO2023/097702

PCT Pub. Date: Jun. 8, 2023

(65) Prior Publication Data

US 2025/0031158 A1 Jan. 23, 2025

(51) Int. Cl.
*H04W 52/42* (2009.01)
*H04B 7/06* (2006.01)
(Continued)

(52) U.S. Cl.
CPC .......... *H04W 52/42* (2013.01); *H04B 7/0691* (2013.01); *H04L 5/0048* (2013.01); *H04W 52/24* (2013.01); *H04W 72/231* (2023.01)

(58) Field of Classification Search
CPC ... H04W 52/42; H04W 52/24; H04W 72/231; H04W 52/14; H04W 52/146; H04W 52/325; H04B 7/0691; H04L 5/0048
See application file for complete search history.

(56) References Cited

U.S. PATENT DOCUMENTS

2010/0246561 A1* 9/2010 Shin .................... H04B 7/0691 375/267
2020/0220676 A1* 7/2020 Xu ........................ H04W 72/04
(Continued)

FOREIGN PATENT DOCUMENTS

CN 110167168 A 8/2019
CN 111417185 A 7/2020
(Continued)

OTHER PUBLICATIONS

Qualcomm Incorporated, "Discussion on SRS enhancement",3GPP TSG-RAN WG1 Meeting #106-e,R1-2107328,e-Meeting, Aug. 16-27, 2021.

(Continued)

*Primary Examiner* — William G Trost, IV
(74) *Attorney, Agent, or Firm* — Volpe Koenig

(57) ABSTRACT

A method and apparatus for sounding reference signal (SRS) power control. The SRS power control is performed by: in response to determining that the transmission power of a plurality of different antenna ports corresponding to different SRS resources of specified antenna switching configurations is unbalanced, sending indication information to a network device, the indication information being used for indicating power adjustment information, and the power adjustment information being used for instructing the network device to adjust actual receiving power of the plurality of different antenna ports corresponding to different SRS resources of the specified antenna switching configurations.

16 Claims, 9 Drawing Sheets

(51) Int. Cl.

| | |
|---|---|
| ***H04L 5/00*** | (2006.01) |
| ***H04W 52/24*** | (2009.01) |
| ***H04W 72/231*** | (2023.01) |

(56) References Cited

U.S. PATENT DOCUMENTS

| | | | | |
|---|---|---|---|---|
| 2020/0245253 | A1 | 7/2020 | Chen et al. | |
| 2020/0383062 | A1* | 12/2020 | Wang | H04L 25/0226 |
| 2022/0174613 | A1* | 6/2022 | Liu | H04W 52/146 |
| 2023/0283428 | A1* | 9/2023 | Shen | H04W 52/367 370/329 |
| 2023/0309024 | A1* | 9/2023 | Spring | H04W 52/367 |
| 2024/0267181 | A1* | 8/2024 | Karjalainen | H04L 5/0012 |

FOREIGN PATENT DOCUMENTS

| | | | |
|---|---|---|---|
| CN | 112534891 | A | 3/2021 |
| CN | 112567773 | A | 3/2021 |
| WO | 2021031028 | A1 | 2/2021 |
| WO | 2021/159399 | A1 | 8/2021 |

OTHER PUBLICATIONS

Qualcomm Incorporated, “Discussion on SRS enhancement”,3GPP TSG-RAN WG1 Meeting #106bis-e,R1-2110170,e-Meeting, Oct. 11-19, 2021.

* cited by examiner

4000

SRS POWER CONTROL METHOD AND APPARATUS, AND STORAGE MEDIUM

CROSS-REFERENCE TO RELATED APPLICATION

The present application is a U.S. National Phase of International Patent Application Serial No. PCT/CN2021/135543 filed on Dec. 3, 2021. The contents of the above-cited application are hereby incorporated by reference in their entirety for all purposes.

BACKGROUND OF THE INVENTION

In order to support a terminal in being capable of effectively obtaining information through a channel under various terminal transmission and reception capabilities, different antenna switching configurations are set for the terminal in a communication system. The different antenna switching configurations correspond to different SRSs.

In SRS enhancement of R17, an implementation structure for the antenna switching configurations may have different designs, for example, an RF switching network may be introduced. Furthermore, for a certain antenna switching configuration, different SRS resource sets may also be configured correspondingly to different antenna ports.

SUMMARY OF THE INVENTION

In order to solve a problem existing in the related art, the disclosure provides an SRS power control method and apparatus, and a storage medium.

According to a first aspect of an example of the disclosure, an SRS power control method is provided, performed by a terminal, and includes: sending indication information to a network device in response to determining that transmission power of a plurality of different antenna ports is unbalanced, the indication information being used for indicating power adjustment information, the power adjustment information being used for instructing the network device to adjust actual receiving power of the plurality of different antenna ports, and the plurality of different antenna ports corresponding to different SRS resources of specified antenna switching configurations.

According to a second aspect of an example of the disclosure, an SRS power control method is provided, performed by a network device, and includes: obtaining indication information reported by a terminal, the indication information being used for indicating power adjustment information, the power adjustment information being used for instructing the network device to adjust actual receiving power of a plurality of different antenna ports, and the plurality of different antenna ports corresponding to different SRS resources of specified antenna switching configurations; and adjusting the actual receiving power of the plurality of different antenna ports based on the indication information.

According to a third aspect of an example of the disclosure, an SRS power control apparatus is provided, and includes: one or more processors, and a memory, configured to store executable instructions of the one or more processors, where the one or more processors are collectively configured to: execute the method described in the first aspect.

According to a fourth aspect of an example of the disclosure, an SRS power control apparatus is provided, and includes: one or more processors, and a memory, configured to store executable instructions of the one or more processors, where the one or more processors are collectively configured to: execute the method described in the second aspect.

According to a fifth aspect of an example of the disclosure, a non-transitory storage medium is provided. The storage medium stores instructions, and the instructions in the storage medium, when executed by one or more processors of a terminal, enable the terminal to execute the method described in the first aspect.

According to a sixth aspect of an example of the disclosure, a non-transitory storage medium is provided. The storage medium stores instructions, and the instructions in the storage medium, when executed by one or more processors of a network device, enable the network device to execute the method described in the second aspect.

It is to be understood that the above general description and the following detailed description are merely for example and explanatory, and cannot limit the disclosure.

BRIEF DESCRIPTION OF DRAWINGS

Accompanying drawings here, which are incorporated in and constitute a part of this specification, illustrate examples consistent with the disclosure and serve to explain the principles of the disclosure together with the specification.

DETAILED DESCRIPTION OF THE INVENTION

Examples will be illustrated in detail here, and instances of which are represented in accompanying drawings. When the following description refers to the accompanying drawings, the same number in the different accompanying drawings represents the same or similar elements unless otherwise indicated. The implementations described in the following examples do not represent all implementations consistent with the disclosure.

The disclosure relates to the technical field of communications, in particular to a sounding reference signal (SRS) power control method and apparatus, and a storage medium.

In order to support a terminal to be capable of effectively obtaining information through a channel under various terminal transmission and reception capabilities, different antenna switching configurations are set for the terminal in a communication system. The different antenna switching configurations correspond to different SRSs.

In SRS enhancement of R17, an implementation structure for the antenna switching configurations may have different designs, for example, an RF switching network may be introduced. Furthermore, for a certain antenna switching configuration, different SRS resource sets may also be configured correspondingly to different antenna ports. However, in the current antenna structure design of the antenna switching configurations and a configuration condition of an SRS resource set, SRS transmission power imbalance of different time slots will occur, and the performance of the downlink channel state information (CSI) will also be affected, resulting in a problem of inconsistent actual coverage of the SRSs of different ports.

Figure 1:
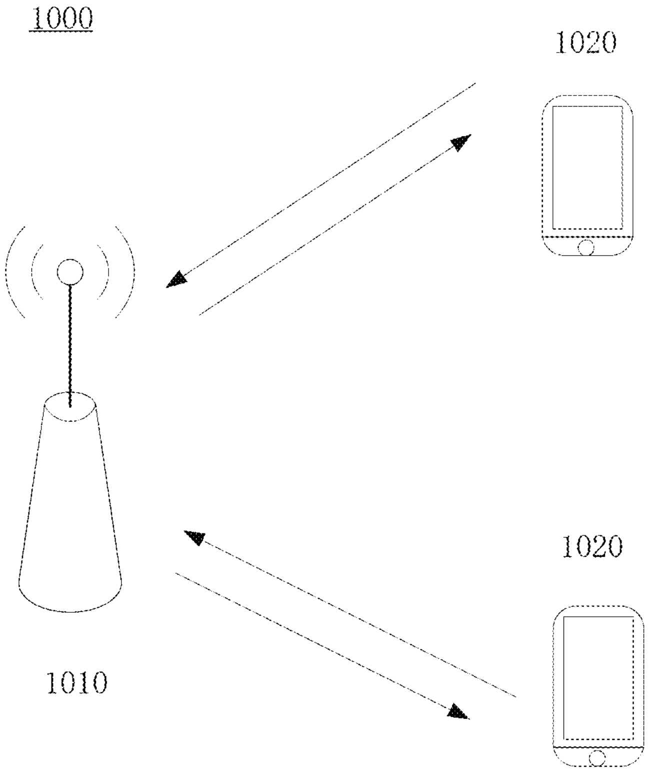
FIG. 1 is a schematic diagram of a wireless communication system shown according to an example.

An SRS power control method provided by an example of the disclosure may be performed by a wireless communication system 1000 shown in FIG. 1. Referring to FIG. 1, the wireless communication system 1000 includes a network device 1010 and a terminal 1020. The terminal 1020 is connected with the network device 1010 through a wireless resource, and performs data transmission.

It may be understood that the wireless communication system 1000 shown in FIG. 1 is merely a schematic illustration, and the wireless communication system 1000 may further include other network devices, for example, may further include a core network device, a wireless relay device, a wireless backhaul device, etc., which are not drawn in FIG. 1. The example of the disclosure does not limit the number of the network devices and the number of the terminals included in the wireless communication system.

It may be further understood that the wireless communication system according to the example of the disclosure is a network providing a wireless communication function. The wireless communication systems may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier-FDMA (SC-FDMA), and carrier sense multiple access with collision avoidance. The network may be divided into a 2G (generation) network, a 3G network, a 4G network, or a future evolution network, such as a 5G network, according to capacity, speed, delay, and other factors of the different networks. The 5G network may also be called a new radio (NR) network. For convenience of description, the disclosure sometimes refers to the wireless communication network simply as the network.

Further, the network device involved in the disclosure may also be called a radio access network device. The wireless access network device may be: a base station, an evolved node B (base station), a femtocell, an access point (AP) in a wireless fidelity (WIFI) system, a wireless relay node, a wireless backhaul node, a transmission point (TP) or a transmission and reception point (TRP), etc., may further be a gNB in an NR system, or may further be a component or part of a device that constitutes the base station. It is to be understood that a specific technology and a specific device form employed by the network device are not limited to the example of the disclosure. In the disclosure, the network device may provide communication coverage for a specific geographic region, and may communicate with a terminal located within the coverage region (a cell). In addition, when it is a vehicle-to-everything (V2X) communication system, the network device may further be a vehicle-mounted device.

Further, the terminal involved in the disclosure may also be called a terminal device, user equipment (UE), a mobile station (MS), a mobile terminal (MT), etc., and is a device that provides voice and/or data connectivity to a user. For example, the terminal may be a handheld device, a vehicle-mounted device, etc., with a wireless connection function. At present, some examples of the terminal are: a mobile phone, customer premise equipment (CPE), a pocket personal computer (PPC), a palm computer, a personal digital assistant (PDA), a notebook computer, a tablet computer, a wearable device, or a vehicle-mounted device, etc. In addition, when it is a vehicle-to-everything (V2X) communication system, the terminal device may further be a vehicle-mounted device. It is to be understood that a specific technology and a specific device form employed by the terminal are not limited to the example of the disclosure.

In the related art, a plurality of transmitting antennas and a plurality of receiving antennas are used at a transmitting end and a receiving end, respectively, so that a signal is transmitted and received through the plurality of antennas at the transmitting end and the receiving end. Multi-transmission and multi-reception are achieved through the plurality of antennas, and without increasing spectrum resources and antenna transmission power, the channel capacity of a system may be doubled, and the data throughput and the signal-to-noise ratio may be increased, thus improving system performance and improving communication quality.

In order to support that downlink information can be effectively obtained through a channel under various terminal transmission and reception capabilities, different antenna switching configurations are set for the terminal in the communication system. The different antenna switching configurations correspond to different SRSs.

In a 5G NR system, triggering of SRS resources may include periodic/semi-persistent/aperiodic SRS resource configuration triggering mechanisms. All parameters of a periodic SRS (P-SRS) are configured by a high-level signaling, and after being configured by the high-level signaling, the terminal periodically sends the same according to the configured parameters. All parameters of a semi-persistent SRS (SP-SRS) are also configured by the high-level signaling, and the difference from the periodic sounding reference signal (SRS) is that although corresponding parameters have been configured, the terminal cannot send the SRS before receiving an activation command. Once the activated terminal begins to send the SRS, the terminal stops sending the SRS until a deactivation command is received by the network device. The activation/deactivation command of the SP-SRS is sent by the MAC layer, i.e., a MAC CE command. Aperiodic SRS resource (AP-SRS) triggering is triggered by an SRS request in downlink control information (DCI).

Figure 2:
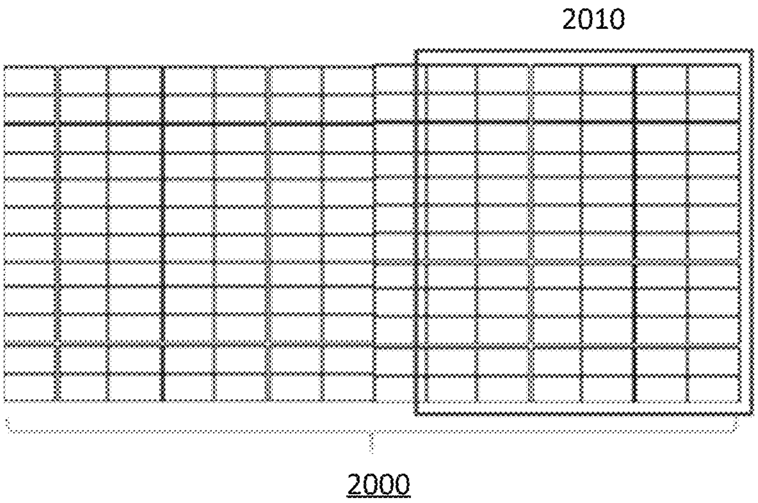
FIG. 2 is a schematic diagram illustrating an SRS mapping region within a time slot, shown according to an example.

In the related art, an uplink SRS may be a periodic SRS, a semi-persistent SRS, or an aperiodic SRS, a narrow band or a wide band, a single-port or a multi-port. Uplink SRS parameters are configured by the network device to the terminal, and include the number of ports, a frequency-domain resource location, a time-domain resource location, a sequence, a sequence cyclic shift, etc. In the 5G NR system, the SRS resources are mapped on at most six symbols of an uplink time slot, and as shown in FIG. 2, an SRS resource mapping region 2010 within a time slot 2000 is shown.

The network device may configure a plurality of uplink SRS resource sets for the terminal, and one SRS resource set includes one or more SRS resources. One SRS resource may be mapped over N consecutive OFDM symbols, where N may occupy 1, 2, or 4 symbols.

In the latest standard version (R17), it is defined that the terminal may transmit the SRS resources on any symbol, and the lengths of the SRS resources may also support transmitting a maximum of 14 symbols.

Further, in the study on R17, considering that there is a demand for a further increase in the number of antennas of the terminal, the number of antennas will be further increased. At present, a maximum of six antennas or a maximum of eight antennas is indicated. A typical antenna configuration currently defined is {1T6R, 1T8R, 2T6R, 2T8R, [4T6R], 4T8R}, as shown in Table 1 below:

TABLE 1

SRS antenna switching combinations up to 8 antennas

| Tx\Rx | 6Rx | 8Rx |
|---|---|---|
| 1T | 1T6R | 1T8R |
| 2T | 2T6R | 2T8R |
| 4T | 4T6R | 4T8R |

Figure 3:
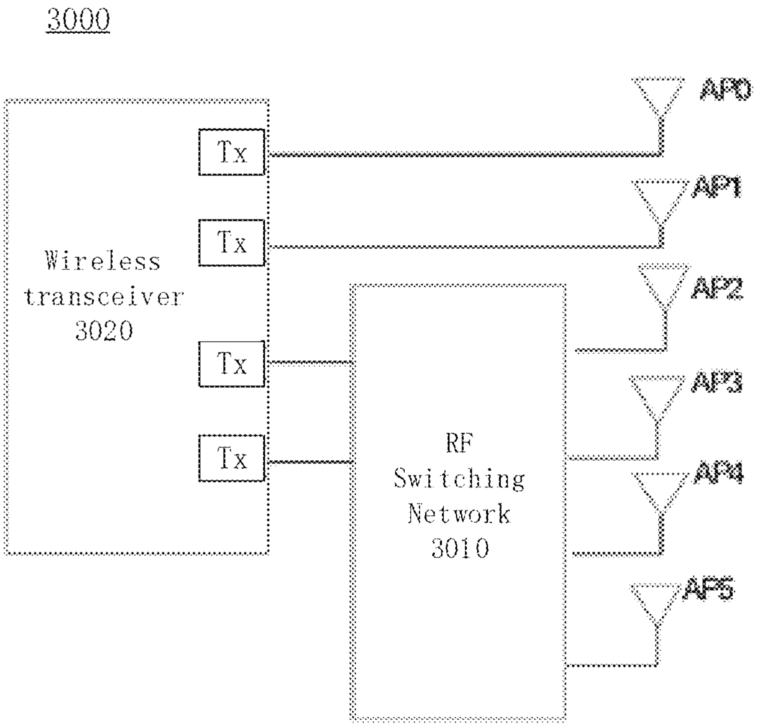
FIG. 3 illustrates a schematic diagram of an antenna structure shown according to an example of the disclosure.

In SRS enhancement of R17, an implementation structure for the antenna switching configurations may have different designs. For example, an RF switching network is introduced, for a certain antenna switching configuration, different SRS resource sets may also be configured correspondingly to different antenna ports. For example, there may be a plurality of different designs for an implementation structure in which the antenna switching configuration is 4T6R. On the basis of a normal four-transmission and four-reception port, the antenna maps an original four transmitting antenna ports to six physical antenna ports through the radio frequency switching network according to an SRS resource configuring method. FIG. 3 illustrates a schematic diagram 3000 of an antenna switching structure 4T6R shown according to an example of the disclosure. Referring to FIG. 3, four antenna transmitting ports (Tx) need to be connected to six physical antenna ports (AP0, AP1, . . . , AP5) through a radio frequency switching circuit. The AP2, AP3, AP4, and AP5 are connected to a part of the TX transmitting antenna of a Wireless Transceiver 3020 (radio frequency receiver) through the RF switching network 3010, and thus, switching to 4T6R is implemented through an intermediate conversion circuit (the RF switching network and the Wireless Transceiver (radio frequency receiver)) on the basis of an original 4T4R antenna implementation structure. The 4T6R is an unbalanced antenna structure. For SRS resources allocated by AP2, AP3, AP4, and AP5, there may be insertion loss. Further, one SRS resource corresponding to four antenna ports and one SRS resource corresponding to two antenna ports may be configured. These two SRS resources may be configured in the same or different SRS resource sets, where the SRS resources configured for different numbers of ports may have a situation of unbalanced SRS transmission power within different time slots due to a conventional power control rule.

Figure 4:
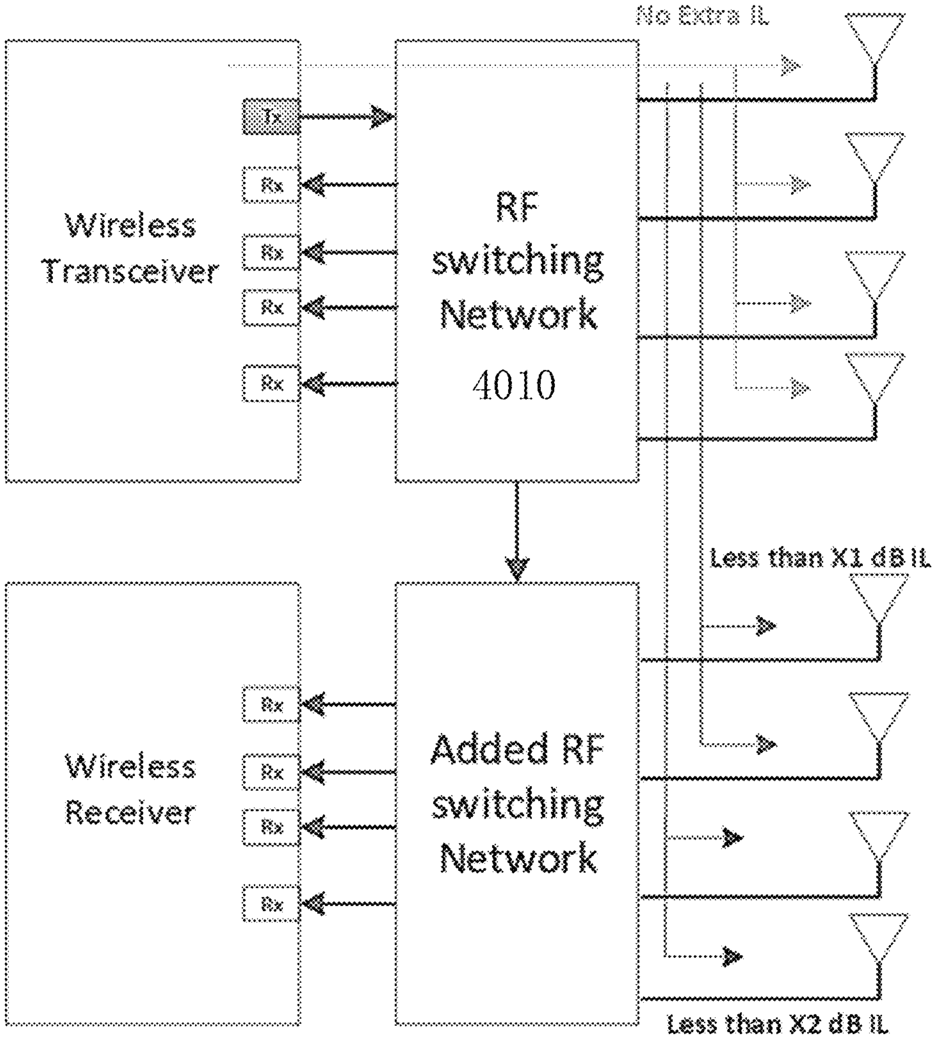
FIG. 4 illustrates a schematic diagram of another antenna structure shown according to an example of the disclosure.

FIG. 4 illustrates a schematic diagram 4000 of another antenna structure shown according to an example of the disclosure. The antenna structure shown in FIG. 4 is also an unbalanced antenna structure introduced with the RF switching network 4010, may have an insertion loss value, and may also have a situation where the transmission power of each antenna port is inconsistent.

Due to the existence of the insertion loss value and the situation in which the SRS transmission power within different time slots is unbalanced, SRS coverage inconsistency will occur, resulting in a problem in channel state information (CSI) acquisition.

In view of this, in the case that the transmission power of a plurality of different antenna ports corresponding to different SRS resources in a certain antenna switching configuration is unbalanced, SRS power controlling and adjusting are the subject of research.

The example of the disclosure provides an SRS power control method. A terminal reports indication information indicating power adjustment, so that a network device adjusts actual receiving power of a plurality of different antenna ports corresponding to different SRS resources of antenna switching configurations, and the network device performs compensation when calculating CSI, so as to solve problems of SRS coverage and CSI acquisition caused by an unbalanced antenna structure, thus SRS coverage is consistent, the CSI is accurately obtained, and performance of a communication system is improved.

Figure 5:
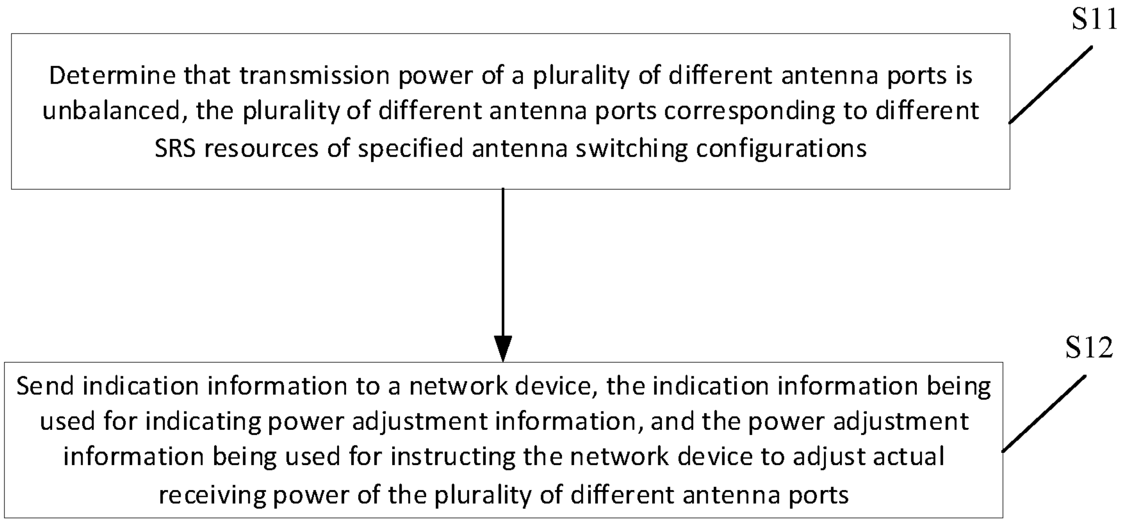
FIG. 5 is a flow diagram of an SRS power control method shown according to an example.

FIG. 5 is a flow diagram of an SRS power control method shown according to an example. As shown in FIG. 5, the SRS power control method is used in a terminal and includes steps 11 and 12.

In step S11, it is determined that the transmission power of a plurality of different antenna ports is unbalanced, the plurality of different antenna ports corresponding to different SRS resources of specified antenna switching configurations.

In step S12, indication information is sent to a network device, the indication information being used for indicating power adjustment information, and the power adjustment information being used for instructing the network device to adjust actual receiving power of the plurality of different antenna ports corresponding to the different SRS resources of the specified antenna switching configurations.

In the example of the disclosure, the specified antenna switching configurations may be one or more currently supported antenna switching configurations. For example, it may be any one of {1T6R, 1T8R, 2T6R, 2T8R, 4T6R, 4T8R}.

The different SRS resources corresponding to the specified antenna switching configurations may be understood as that different SRS resource sets are configured for the different antenna ports. For example, in the antenna switching configuration for 4T6R involved in the above example, two SRS resource sets are configured, where a first SRS resource set corresponds to four antenna ports, and a second SRS resource set corresponds to two antenna ports.

The plurality of different antenna ports of the different SRS resources may be understood as that the different SRS resources are configured for the different antenna ports, and the different SRS resources correspond to the different antenna ports. Following the above example, two SRS resource sets are configured in the antenna switching configuration for 4T6R. The different antenna ports corresponding to the different SRS resource sets may be, for example, the four antenna ports corresponding to the first SRS resource set and the two antenna ports corresponding to the second SRS resource set.

Power imbalance of the different antenna ports may be construed as that power of the different antenna ports corresponding to the different SRS resources is not equal. Following the above example, two SRS resource sets are configured in the antenna switching configuration for 4T6R, where the total transmission power of each SRS resource set is consistent. For the first SRS resource set corresponding to the four antenna ports, the total transmission power is equally divided among the four antenna ports. For the second SRS resource set corresponding to the two antenna ports, the total transmission power is equally divided between the two antenna ports. Thus, the transmission power of each of the four antenna ports corresponding to the first SRS resource set is inconsistent with the transmission power of each of the two antenna ports corresponding to the second SRS resource set, for example, the power of the different antenna ports is unbalanced.

In the example of the disclosure, in response to determining by the terminal that the transmission power of the plurality of different antenna ports corresponding to the different SRS resources of the specified antenna switching configurations is unbalanced, the terminal sends the indication information used for indicating the power adjustment information to the network device, so that the network device adjusts the actual receiving power of the plurality of different antenna ports corresponding to the different SRS resources of the specified antenna switching configurations. For example, the network device performs corresponding compensation during CSI calculation based on the received power adjustment information, so as to achieve an effect of SRS coverage consistency and improve the system performance.

In an implementation of the example of the disclosure, the power adjustment information sent by the terminal to the network device may be determined based on insertion loss value information and transmission power imbalance issues of the different antenna ports.

In the example of the disclosure, the power adjustment information sent by the terminal to the network device may include, for example, at least one of:

A: insertion loss value information of the different antenna ports corresponding to the different SRS resources.

B: transmission power imbalance issues of the different antenna ports corresponding to the different SRS resources.

The insertion loss value information involved in the example of the disclosure may be determined based on an insertion loss value calculated by the terminal. For example, the insertion loss value information may be a recommended insertion loss value, may also be an insertion loss value level index, or may further be the recommended insertion loss value and the insertion loss value level index. The recommended insertion loss value may be an insertion loss value calculated by the terminal. The insertion loss value level index may be pre-defined, where different insertion loss value level indices correspond to different insertion loss value ranges.

The transmission power imbalance issues involved in the example of the disclosure may be transmission power imbalance offsets of the different antenna ports. The number of the transmission power imbalance offsets of the different antenna ports may be one or more.

In one implementation, when sending the indication information to the network device, the terminal considers the insertion loss value information of the different antenna ports of the different SRS resources. For example, the power adjustment information indicated by the indication information includes the insertion loss value information of the different antenna ports corresponding to the different SRS resources.

Figure 6:
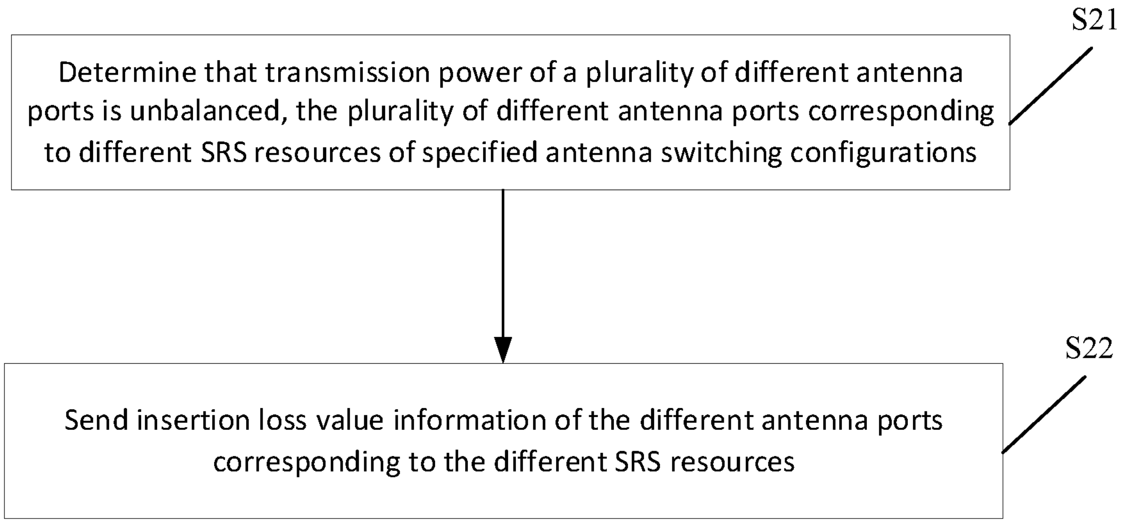
FIG. 6 is a flow diagram of an SRS power control method shown according to an example.

FIG. 6 is a flow diagram of an SRS power control method shown according to an example. As shown in FIG. 6, the SRS power control method is used in a terminal and includes steps 21 and 22.

In step S21, it is determined that transmission power of a plurality of different antenna ports is unbalanced, the plurality of different antenna ports corresponding to different SRS resources of specified antenna switching configurations.

In step S22, insertion loss value information of the different antenna ports corresponding to the different SRS resources is sent.

The insertion loss value information sent by the terminal includes at least one of: a recommended insertion loss value; or an insertion loss value level index, where different insertion loss value level indexes correspond to different insertion loss value ranges.

In one implementation, when sending indication information to a network device, the terminal considers transmission power imbalance issues of the different antenna ports of the different SRS resources. For example, power adjustment information indicated by the indication information includes the transmission power imbalance issues of the different antenna ports corresponding to the different SRS resources.

Figure 7:
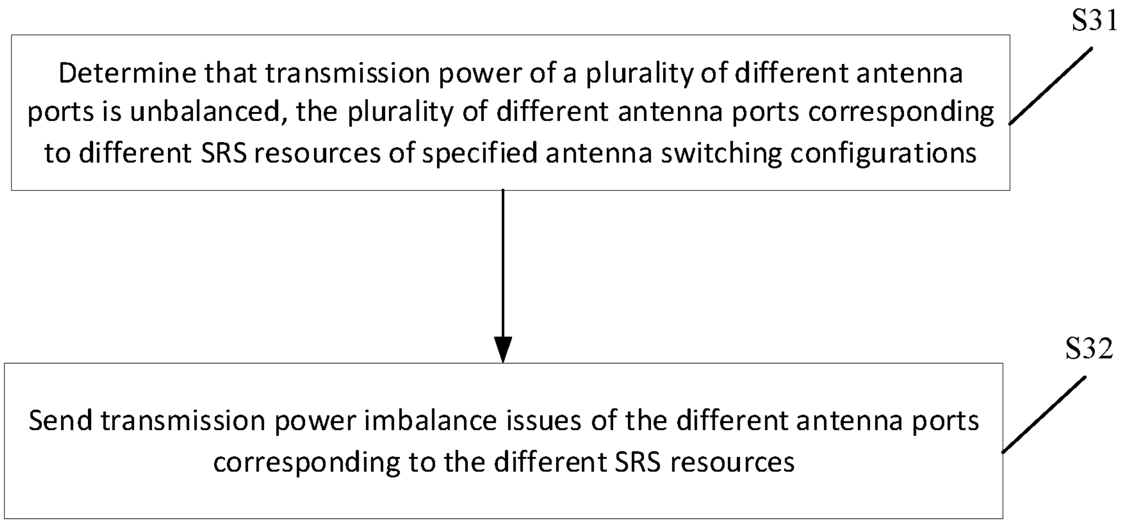
FIG. 7 is a flow diagram of an SRS power control method shown according to an example.

FIG. 7 is a flow diagram of an SRS power control method shown according to an example. As shown in FIG. 7, the SRS power control method is used in a terminal and includes steps 31 and 32.

In step S31, it is determined that transmission power of a plurality of different antenna ports is unbalanced, the plurality of different antenna ports corresponding to different SRS resources of specified antenna switching configurations.

In step S32, transmission power imbalance issues of the different antenna ports corresponding to the different SRS resources are sent.

The transmission power imbalance issues sent by the terminal include transmission power imbalance offsets of the different antenna ports corresponding to the different SRS resources. There may be one or more transmission power imbalance offsets sent by the terminal. There may also be one or more transmission power imbalance offsets corresponding to each antenna port.

In one implementation, when sending indication information to a network device, the terminal considers insertion loss value information of the different antenna ports corresponding to the different SRS resources, and transmission power imbalance issues of the different antenna ports corresponding to the different SRS resources. For example, power adjustment information indicated by the indication information sent by the terminal includes the insertion loss value information of the different antenna ports corresponding to the different SRS resources, and the transmission power imbalance issues of the different antenna ports corresponding to the different SRS resources.

Figure 8:
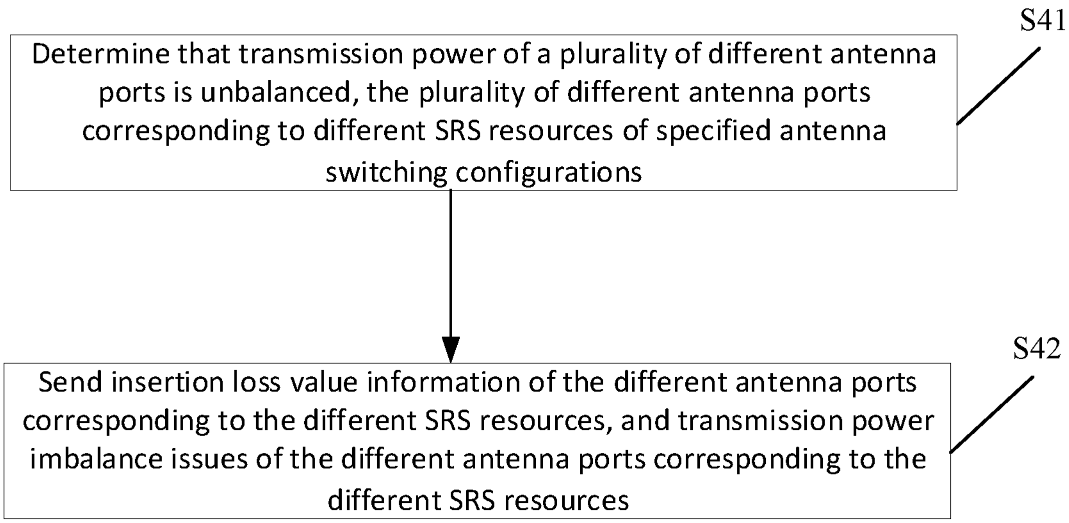
FIG. 8 is a flow diagram of an SRS power control method shown according to an example.

FIG. 8 is a flow diagram of an SRS power control method shown according to an example. As shown in FIG. 8, the SRS power control method is used in a terminal and includes steps 41 and 42.

In step S41, it is determined that transmission power of a plurality of different antenna ports is unbalanced, the plurality of different antenna ports corresponding to different SRS resources of specified antenna switching configurations.

In step S42, insertion loss value information of the different antenna ports corresponding to the different SRS resources, as well as transmission power imbalance issues of the different antenna ports corresponding to the different SRS resources, are sent.

The insertion loss value information includes an insertion loss value level index, and different insertion loss value level indices correspond to different insertion loss value ranges. The transmission power imbalance issues include transmission power imbalance offsets of the different antenna ports corresponding to the different SRS resources. The transmission power imbalance offsets may be a numeric value obtained by comprehensive consideration and calculation by the terminal based on the transmission power of the different antenna ports of the different SRS resources.

In the example of the disclosure, in response to determining by the terminal that the transmission power of the plurality of different antenna ports corresponding to the different SRS resources of the specified antenna switching configurations is unbalanced, the terminal may calculate, based on an SRS power control rule, transmission power of SRS resources of a plurality of antenna ports with power imbalance of an antenna switching configuration, so as to obtain a power compensation value of the transmission power. The terminal sends power compensation information indicating the power compensation value to a network device, so that the network device performs corresponding compensation on the power compensation value during CSI calculation based on the power compensation information, so as to achieve an effect of SRS coverage consistency and improve the system performance.

Figure 9:
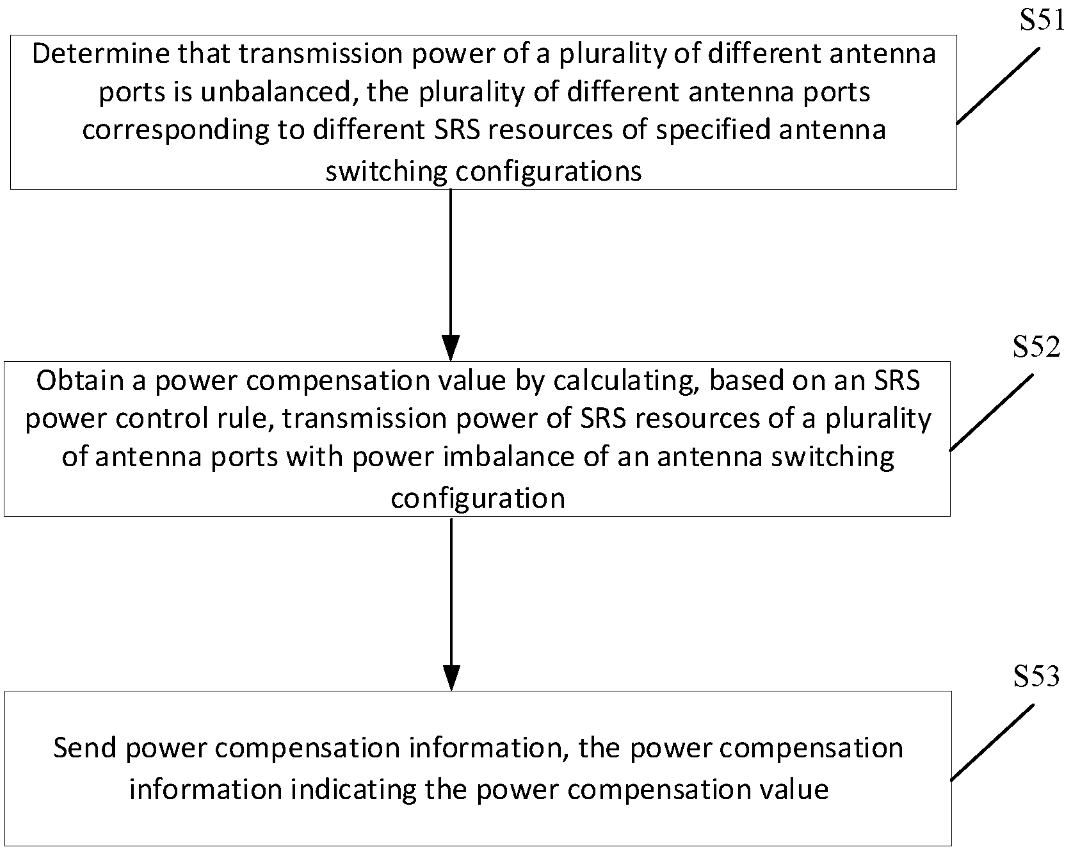
FIG. 9 is a flow diagram of an SRS power control method shown according to an example.

FIG. 9 is a flow diagram of an SRS power control method shown according to an example. As shown in FIG. 9, the SRS power control method is used in a terminal and includes steps 51, 52, and 53.

In step S51, it is determined that transmission power of a plurality of different antenna ports is unbalanced, the plurality of different antenna ports corresponding to different SRS resources of specified antenna switching configurations.

In step S52, a power compensation value is obtained by calculating, based on an SRS power control rule, the transmission power of SRS resources of a plurality of antenna ports with a power imbalance of an antenna switching configuration.

In step S53, power compensation information is sent, the power compensation information indicating the power compensation value.

The power compensation value is calculated by the terminal based on the transmission power of the SRS resources. The SRS resources for calculating the power compensation value correspond to the plurality of antenna ports with power imbalance of the specified antenna switching configurations.

It may be understood that, in the above examples of the disclosure, when the terminal sends indication information to a network device, on the one hand, the indication information may be sent through RRC signaling, and on the other hand, the indication information may also be sent based on MAC-CE.

According to the SRS power control method provided by the example of the disclosure, in a case that the terminal determines that the transmission power of the plurality of different antenna ports corresponding to the different SRS resources of the specified antenna switching configurations is unbalanced, power adjustment information is sent to the network device, so as to instruct the network device to adjust actual receiving power of the plurality of different antenna ports corresponding to the different SRS resources of the specified antenna switching configurations. Thus, when calculating the actual power of the antenna ports corresponding to the SRS resources, the network device considers the corresponding power adjustment information to obtain a relatively accurate CSI calculation result, so as to achieve an effect of SRS coverage consistency and improve system performance.

Based on the same concept, an example of the disclosure further provides an SRS power control method executed by a network device.

Figure 10:
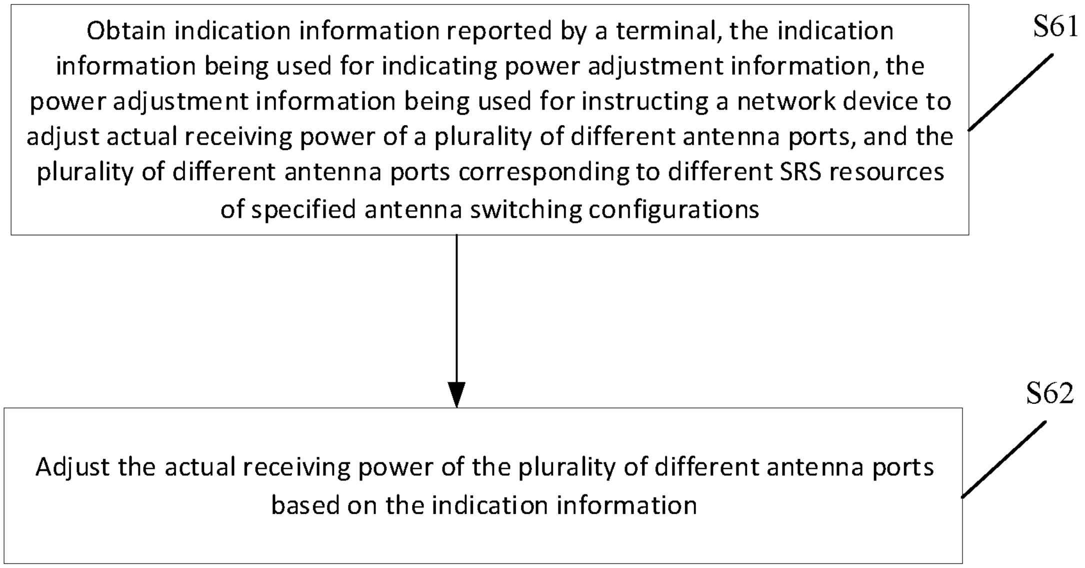
FIG. 10 is a flow diagram of an SRS power control method shown according to an example.

FIG. 10 is a flow diagram of an SRS power control method shown according to an example. As shown in FIG. 10, the SRS power control method is used in a network device and includes steps 61 and 62.

In step S61, indication information reported by a terminal is obtained, the indication information being used for indicating power adjustment information, the power adjustment information being used for instructing the network device to adjust actual receiving power of a plurality of different antenna ports, and the plurality of different antenna ports corresponding to different SRS resources of specified antenna switching configurations.

In step S62, the actual receiving power of the plurality of different antenna ports is adjusted based on the indication information.

In one implementation, the power adjustment information includes at least one of: insertion loss value information of the different antenna ports corresponding to the different SRS resources, or transmission power imbalance issues of the different antenna ports corresponding to the different SRS resources.

In one implementation, the power adjustment information includes the insertion loss value information of the different antenna ports corresponding to the different SRS resources. The insertion loss value information may be determined based on an insertion loss value calculated by the terminal. For example, the insertion loss value information may be a recommended insertion loss value, may also be an insertion loss value level index, or may further be the recommended insertion loss value and the insertion loss value level index. The recommended insertion loss value may be an insertion loss value calculated by the terminal. The insertion loss value level index may be pre-defined, where different insertion loss value level indices correspond to different insertion loss value ranges.

In one implementation, the power adjustment information includes the transmission power imbalance issues of the different antenna ports corresponding to the different SRS resources. The transmission power imbalance issues include transmission power imbalance offsets of the different antenna ports corresponding to the different SRS resources. There may be one or more transmission power imbalance offsets. There may also be one or more transmission power imbalance offsets corresponding to each antenna port.

In one implementation, the power adjustment information includes the insertion loss value information of the different antenna ports corresponding to the different SRS resources, and the transmission power imbalance issues of the different antenna ports corresponding to the different SRS resources.

The insertion loss value information includes the insertion loss value level index, where the different insertion loss value level indices correspond to different insertion loss value ranges. The transmission power imbalance issues include the transmission power imbalance offsets of the different antenna ports corresponding to the different SRS resources.

In one implementation, the power adjustment information includes power compensation information. The power compensation information is obtained by the terminal by calculating, based on an SRS power control rule, the transmission power of SRS resources of a plurality of antenna ports with a power imbalance of an antenna switching configuration.

In the examples of the disclosure, the network device may receive the indication information used for indicating the power adjustment information based on an RRC signaling or an MAC-CE.

In the example of the disclosure, the network device obtains the indication information used to indicate the power adjustment information sent by the terminal. When calculating the actual power of the antenna ports corresponding to the SRS resources, the network device considers the corresponding power adjustment information to obtain a relatively accurate CSI calculation result, so as to achieve the effect of SRS coverage consistency and improve system performance.

It may be understood that the SRS power control method performed by the network device in the example of the disclosure has similarities with the SRS power control method performed by the terminal. Thus, for the description of the SRS power control method performed by the network device for example not detailed enough, refer to the relevant content of the SRS power control method performed by the terminal, which will not be elaborated here.

It may be further understood that the SRS power control method provided by the example of the disclosure is applicable to a process of implementing SRS power control through interaction between the terminal and the network device. In the process of implementing SRS power control through the interaction between the terminal and the network device, the terminal and the network device have the relevant functions in the above examples.

It is to be noted that those skilled in the art can understand that the various above-mentioned implementations/examples of the examples of the disclosure can be used in conjunction with the aforementioned examples or independently. Its implementation principle is similar whether to be used alone or with the aforementioned examples. In the example of the disclosure, part of the examples is illustrated through the implementations used together. Certainly, those skilled in the art can understand that such examples do not limit the examples of the disclosure.

Based on the same concept, an example of the disclosure further provides an SRS power control apparatus.

It may be understood that, in order to implement the above functions, the SRS power control apparatus provided by the example of the disclosure contains corresponding hardware structures and/or software modules for executing all the functions. Combining with units and algorithm steps of each example disclosed in the example of the disclosure, the example of the disclosure can be implemented in a form of hardware or a combination of hardware and computer software. Whether a certain function is executed in a mode of hardware or a mode of the hardware driven by the computer software depends on a specific application and design constraint conditions of the technical solution. Those skilled in the art may use different methods for each specific application to implement the described functions, but such implementation may not be regarded beyond the scope of the technical solution of the example of the disclosure.

Figure 11:
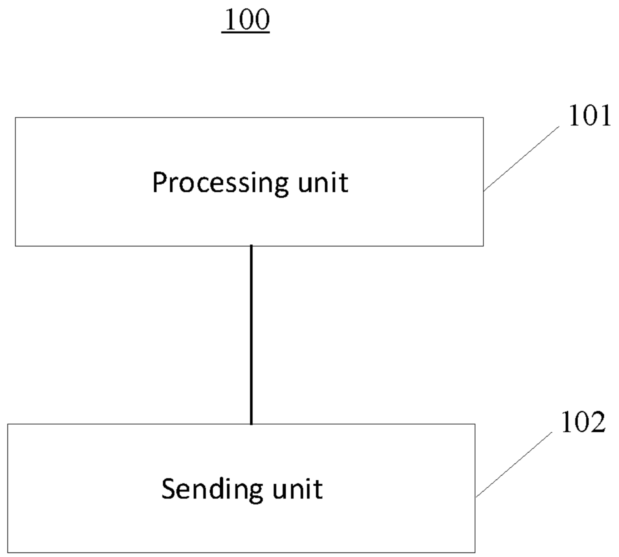
FIG. 11 is a block diagram of an SRS power control apparatus shown according to an example.

FIG. 11 is a block diagram of an SRS power control apparatus shown according to an example. Referring to FIG. 11, the SRS power control apparatus 100 may be provided as a terminal involved in the above examples, including a processing unit 101 and a sending unit 102.

The processing unit 101 is configured to determine that transmission power of a plurality of different antenna ports is unbalanced. The sending unit 102 is configured to send indication information to a network device, the indication information being used for indicating power adjustment information, the power adjustment information being used for instructing the network device to adjust actual receiving power of the plurality of different antenna ports, and the plurality of different antenna ports corresponding to different SRS resources of specified antenna switching configurations.

In one implementation, the power adjustment information includes at least one of: insertion loss value information of the different antenna ports corresponding to the different SRS resources; or transmission power imbalance issues of the different antenna ports corresponding to the different SRS resources.

In one implementation, the power adjustment information includes the insertion loss value information of the different antenna ports corresponding to the different SRS resources. The insertion loss value information includes at least one of: a recommended insertion loss value; or an insertion loss value level index, where different insertion loss value level indexes correspond to different insertion loss value ranges.

In one implementation, the power adjustment information includes the transmission power imbalance issues of the different antenna ports corresponding to the different SRS resources. The transmission power imbalance issues include transmission power imbalance offsets of the different antenna ports corresponding to the different SRS resources.

In one implementation, the power adjustment information includes the insertion loss value information of the different antenna ports corresponding to the different SRS resources, and the transmission power imbalance issues of the different antenna ports corresponding to the different SRS resources. The insertion loss value information includes the insertion loss value level index, where the different insertion loss value level indexes correspond to different insertion loss value ranges. The transmission power imbalance issues include the transmission power imbalance offsets of the different antenna ports corresponding to the different SRS resources.

In one implementation, the power adjustment information includes power compensation information, and the power compensation information is obtained by the terminal by calculating, based on an SRS power control rule, transmission power of SRS resources of a plurality of antenna ports with power imbalance of an antenna switching configuration.

In one implementation, the sending unit 102 sends the indication information to the network device based on an RRC signaling or an MAC-CE.

Figure 12:
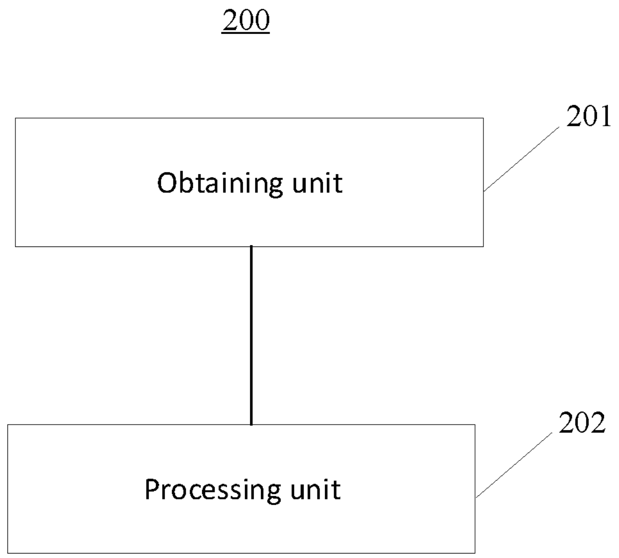
FIG. 12 is a block diagram of an SRS power control apparatus shown according to an example.

FIG. 12 is a block diagram of an SRS power control apparatus shown according to an example. Referring to FIG. 12, the SRS power control apparatus 200 may be provided as a network device involved in the above examples, including an obtaining unit 201 and a processing unit 202.

The obtaining unit 201 is configured to obtain indication information reported by a terminal, the indication information being used for indicating power adjustment information, and the power adjustment information being used for instructing the network device to adjust actual receiving power of a plurality of different antenna ports. The processing unit 202 is configured to adjust the actual receiving power of the plurality of different antenna ports based on the indication information, the plurality of different antenna ports corresponding to different SRS resources of specified antenna switching configurations.

In one implementation, the power adjustment information includes at least one of:

insertion loss value information of the different antenna ports corresponding to the different SRS resources; or transmission power imbalance issues of the different antenna ports corresponding to the different SRS resources.

In one implementation, the power adjustment information includes the insertion loss value information of the different antenna ports corresponding to the different SRS resources. The insertion loss value information includes at least one of: a recommended insertion loss value; or an insertion loss value level index, where different insertion loss value level indexes correspond to different insertion loss value ranges.

In one implementation, the power adjustment information includes the transmission power imbalance issues of the different antenna ports corresponding to the different SRS resources. The transmission power imbalance issues include transmission power imbalance offsets of the different antenna ports corresponding to the different SRS resources.

In one implementation, the power adjustment information includes the insertion loss value information of the different antenna ports corresponding to the different SRS resources, and the transmission power imbalance issues of the different antenna ports corresponding to the different SRS resources. The insertion loss value information includes the insertion loss value level index, where the different insertion loss value level indexes correspond to different insertion loss value ranges. The transmission power imbalance issues include the transmission power imbalance offsets of the different antenna ports corresponding to the different SRS resources.

In one implementation, the power adjustment information includes power compensation information, and the power compensation information is obtained by the terminal by calculating, based on an SRS power control rule, transmission power of SRS resources of a plurality of antenna ports with power imbalance of an antenna switching configuration.

In one implementation, the obtaining unit 201 receives the indication information based on an RRC signaling or an MAC-CE.

As for the apparatus in the above examples, the specific modes for executing operations by all the modules have been described in detail in the examples related to the method, which are not illustrated in detail here.

Figure 13:
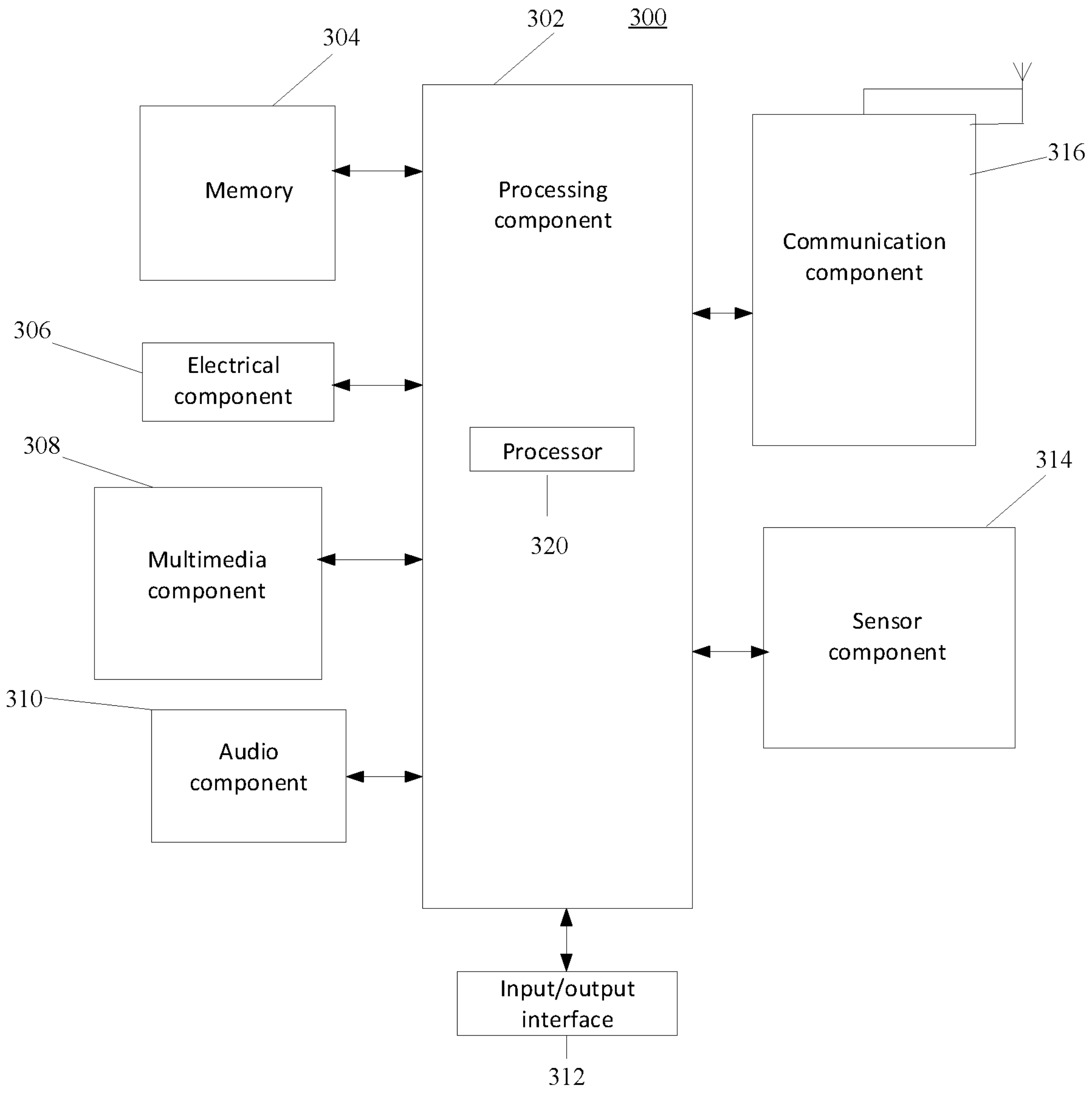
FIG. 13 is a block diagram of an apparatus for SRS power control shown according to an example.

FIG. 13 is a block diagram of an apparatus for SRS power control shown according to an example. For example, the apparatus 300 may be provided as a terminal. For example, the apparatus 300 may be a mobile phone, a computer, a digital broadcast terminal, a message transceiving device, a game console, a tablet device, a medical device, a fitness device, a personal digital assistant, and the like.

Referring to FIG. 13, the apparatus 300 may include one or more of the following components: a processing component 302, a memory 304, an electrical component 306, a multimedia component 308, an audio component 310, an input/output (I/O) interface 312, a sensor component 314, and a communication component 316.

The processing component 302 usually controls an overall operation of the apparatus 300, such as operations associated with displaying, telephone calling, data communication, a camera operation and a record operation. The processing component 302 may include one or more processors 320 to execute an instruction, so as to complete all or part of steps of the above method. In addition, the processing component 302 may include one or more modules, so as to facilitate interaction between the processing component 302 and other components. For example, the processing component 302 may include a multimedia module, so as to facilitate interaction between the multimedia component 308 and the processing component 302.

The memory 304 is configured to store various types of data so as to support operations on the apparatus 300. Examples of these data include instructions of any application program or method used to be operated on the apparatus 300, contact data, telephone directory data, messages, pictures, videos, and the like. The memory 304 may be implemented by any type of volatile or nonvolatile storage device or their combinations, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The electrical component 306 provides electric power for various components of the apparatus 300. The electrical component 306 may include a power management system, one or more power sources, and other components associated with generating, managing and distributing electric power for the apparatus 300.

The multimedia component 308 includes a screen providing an output interface between the apparatus 300 and a user. In some examples, the screen may include a liquid crystal display (LCD) and a touch panel (TP). In response to determining that the screen includes the touch panel, the screen may be implemented as a touch screen so as to receive an input signal from the user. The touch panel includes one or more touch sensors to sense touching, swiping and gestures on the touch panel. The touch sensor may not only sense a boundary of a touching or swiping action, but also detect duration and pressure related to the touching or swiping operation. In some examples, the multimedia component 308 includes a front camera and/or a back camera. In response to determining that the apparatus 300 is in an operation mode, such as a shooting mode or a video mode, the front camera and/or the back camera may receive external multimedia data. Each front camera and each back camera may be a fixed optical lens system or have a focal length and optical zooming capability.

The audio component 310 is configured to output and/or input an audio signal. For example, the audio component 310 includes a microphone (MIC). In response to determining that the apparatus 300 is in an operation mode, such as a call mode, a recording mode or a speech recognition mode, the microphone is configured to receive an external audio signal. The received audio signal may be further stored in the memory 304 or sent via the communication component 316. In some examples, the audio component 310 further includes a speaker for outputting the audio signal.

The I/O interface 312 provides an interface between the processing component 302 and a peripheral interface module, and the above peripheral interface module may be a keyboard, a click wheel, buttons, etc. These buttons may include but are not limited to: a home button, a volume button, a start button and a lock button.

The sensor component 314 includes one or more sensors for providing state evaluations of all aspects for the apparatus 300. For example, the sensor component 314 may detect an on/off state of the apparatus 300 and relative positioning of components, for example, the components are a display and a keypad of the apparatus 300. The sensor component 314 may further detect location change of the apparatus 300 or one component of the apparatus 300, the presence or absence of contact between the user and the apparatus 300, orientation or speed up/speed down of the apparatus 300, and temperature change of the apparatus 300. The sensor component 314 may include a proximity sensor, which is configured to detect existence of a nearby object without any physical contact. The sensor component 314 may further include an optical sensor, such as a CMOS or CCD image sensor, for use in an imaging application. In some examples, the sensor component 314 may further include an acceleration sensor, a gyroscope sensor, a magnetic sensor, a pressure sensor or a temperature sensor.

The communication component 316 is configured to facilitate wired or wireless communication between the apparatus 300 and other devices. The apparatus 300 may access a wireless network based on a communication standard, such as WiFi, 2G or 3G, or their combinations. In one example, the communication component 316 receives a broadcast signal or broadcast related information from an external broadcast management system via a broadcast channel. In one example, the communication component 316 further includes a near-field communication (NFC) module so as to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In the example, the apparatus 300 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors or other electronic elements for executing the above method.

In the example, a non-transitory computer readable storage medium including instructions is further provided, such as a memory 304 including instructions. The above instructions may be executed by a processor 320 of an apparatus 300 so as to complete the above method. For example, the non-transitory computer readable storage medium may be an ROM, a random access memory (RAM), a CD-ROM, a magnetic tape, a floppy disk, an optical data storage device and the like.

Figure 14:
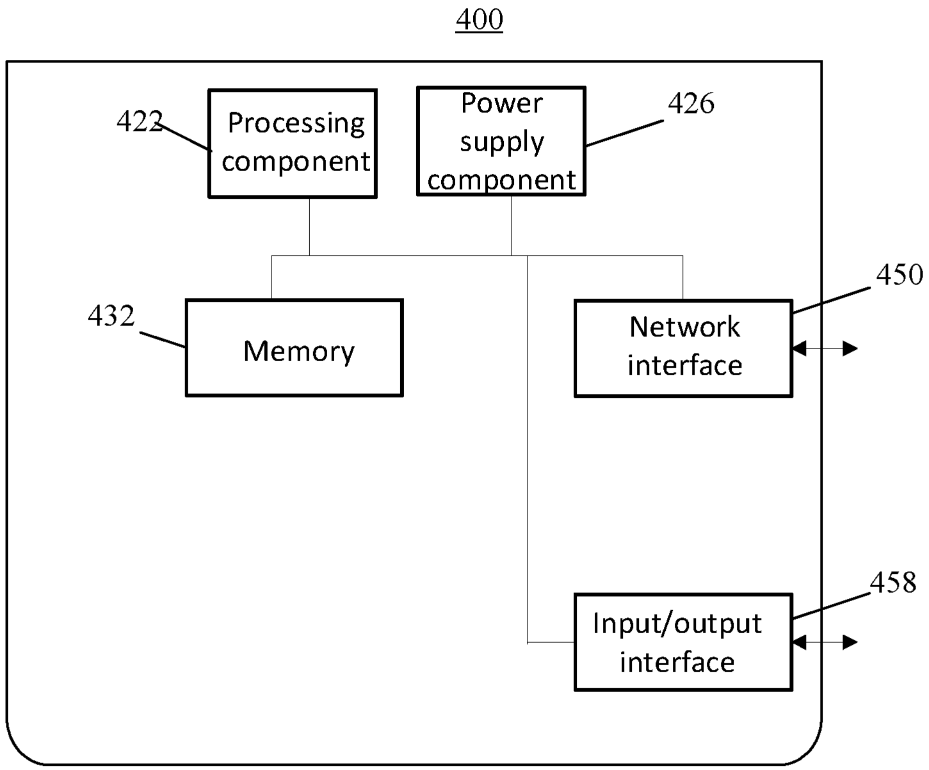
FIG. 14 is a block diagram of an apparatus for SRS power control, shown according to an example.

FIG. 14 is a block diagram of an apparatus for SRS power control shown according to an example. For example, the apparatus 400 may be provided as a network device. Referring to FIG. 14, the apparatus 400 includes a processing component 422, which further includes one or more processors, and a memory resource represented by a memory 432, for storing instructions executable by the processing component 422, such as an application program. The application program stored in the memory 432 may include one or more modules with each corresponding to a set of instructions. In addition, the processing component 422 is configured to execute the instructions to execute the above method.

The apparatus 400 may further include a power supply component 426 configured to execute power management of the apparatus 400, a wired or wireless network interface 450 configured to connect the apparatus 400 to a network, and an input/output (I/O) interface 458. The apparatus 400 may operate based on an operating system stored in the memory 432, such as Windows Server™, Mac OS X™, Unix™, Linux™, FreeBSD™, or the like.

In the example, a non-transitory computer readable storage medium, including instructions, is further provided, such as a memory 432, which includes instructions. The above instructions may be executed by a processing component 422 of an apparatus 400 so as to complete the above method. For example, the non-transitory computer readable storage medium may be an ROM, a random access memory (RAM), a CD-ROM, a magnetic tape, a floppy disk, an optical data storage device and the like.

According to a first aspect of an example of the disclosure, an SRS power control method is provided, performed by a terminal, and includes:

sending indication information to a network device in response to determining that transmission power of a plurality of different antenna ports is unbalanced, the indication information being used for indicating power adjustment information, the power adjustment information being used for instructing the network device to adjust actual receiving power of the plurality of different antenna ports, and the plurality of different antenna ports corresponding to different SRS resources of specified antenna switching configurations.

In one implementation, the power adjustment information includes at least one of:

insertion loss value information of the different antenna ports corresponding to the different SRS resources; or transmission power imbalance issues of the different antenna ports corresponding to the different SRS resources.

In one implementation, the power adjustment information includes the insertion loss value information of the different antenna ports corresponding to the different SRS resources; and the insertion loss value information includes at least one of: a recommended insertion loss value; or an insertion loss value level index, where different insertion loss value level indexes correspond to different insertion loss value ranges.

In one implementation, the power adjustment information includes the transmission power imbalance issues of the different antenna ports corresponding to the different SRS resources; and the transmission power imbalance issues include transmission power imbalance offsets of the different antenna ports corresponding to the different SRS resources.

In one implementation, the power adjustment information includes the insertion loss value information of the different antenna ports corresponding to the different SRS resources, and the transmission power imbalance issues of the different antenna ports corresponding to the different SRS resources; the insertion loss value information includes an insertion loss value level index, where different insertion loss value level indexes correspond to different insertion loss value ranges; and the transmission power imbalance issues include transmission power imbalance offsets of the different antenna ports corresponding to the different SRS resources.

In one implementation, the power adjustment information includes power compensation information, and the power compensation information is obtained by the terminal by calculating, based on an SRS power control rule, transmission power of SRS resources of a plurality of antenna ports with power imbalance of an antenna switching configuration.

In one implementation, sending the indication information to the network device includes: sending the indication information to the network device based on a Radio Resource Control (RRC) signaling or a Media Access Control-Control Element (MAC-CE).

According to a second aspect of an example of the disclosure, an SRS power control method is provided, performed by a network device, and includes:

obtaining indication information reported by a terminal, the indication information being used for indicating power adjustment information, the power adjustment information being used for instructing the network device to adjust actual receiving power of a plurality of different antenna ports, and the plurality of different antenna ports corresponding to different SRS resources of specified antenna switching configurations; and adjusting the actual receiving power of the plurality of different antenna ports based on the indication information.

In one implementation, the power adjustment information includes at least one of:

insertion loss value information of the different antenna ports corresponding to the different SRS resources; or transmission power imbalance issues of the different antenna ports corresponding to the different SRS resources.

In one implementation, the power adjustment information includes the insertion loss value information of the different antenna ports corresponding to the different SRS resources; and the insertion loss value information includes at least one of: a recommended insertion loss value; or an insertion loss value level index, where different insertion loss value level indexes correspond to different insertion loss value ranges.

In one implementation, the power adjustment information includes the transmission power imbalance issues of the different antenna ports corresponding to the different SRS resources; and the transmission power imbalance issues include transmission power imbalance offsets of the different antenna ports corresponding to the different SRS resources.

In one implementation, the power adjustment information includes the insertion loss value information of the different antenna ports corresponding to the different SRS resources, and the transmission power imbalance issues of the different antenna ports corresponding to the different SRS resources; the insertion loss value information includes an insertion loss value level index, where different insertion loss value level indexes correspond to different insertion loss value ranges; and the transmission power imbalance issues include transmission power imbalance offsets of the different antenna ports corresponding to the different SRS resources.

In one implementation, the power adjustment information includes power compensation information, and the power compensation information is obtained by the terminal by calculating, based on an SRS power control rule, transmission power of SRS resources of a plurality of antenna ports with power imbalance of an antenna switching configuration.

In one implementation, obtaining the indication information includes: receiving the indication information based on a RRC signaling or a MAC-CE.

According to a third aspect of an example of the disclosure, an SRS power control apparatus is provided, and includes:

- a processing unit, configured to determine that transmission power of a plurality of different antenna ports is unbalanced, the plurality of different antenna ports corresponding to different SRS resources of specified antenna switching configurations; and a sending unit, configured to send indication information to a network device, the indication information being used for indicating power adjustment information, and the power adjustment information being used for instructing the network device to adjust actual receiving power of the plurality of different antenna ports.

In one implementation, the power adjustment information includes at least one of:

- insertion loss value information of the different antenna ports corresponding to the different SRS resources; or transmission power imbalance issues of the different antenna ports corresponding to the different SRS resources.

In one implementation, the power adjustment information includes the insertion loss value information of the different antenna ports corresponding to the different SRS resources; and the insertion loss value information includes at least one of: a recommended insertion loss value; or an insertion loss value level index, where different insertion loss value level indexes correspond to different insertion loss value ranges.

In one implementation, the power adjustment information includes the transmission power imbalance issues of the different antenna ports corresponding to the different SRS resources; and the transmission power imbalance issues include transmission power imbalance offsets of the different antenna ports corresponding to the different SRS resources.

In one implementation, the power adjustment information includes the insertion loss value information of the different antenna ports corresponding to the different SRS resources, and the transmission power imbalance issues of the different antenna ports corresponding to the different SRS resources; the insertion loss value information includes an insertion loss value level index, where different insertion loss value level indexes correspond to different insertion loss value ranges; and the transmission power imbalance issues include transmission power imbalance offsets of the different antenna ports corresponding to the different SRS resources.

In one implementation, the power adjustment information includes power compensation information, and the power compensation information is obtained by a terminal by calculating, based on an SRS power control rule, transmission power of SRS resources of a plurality of antenna ports with power imbalance of an antenna switching configuration.

In one implementation, the sending unit sends the indication information to the network device based on a RRC signaling or a MAC-CE.

According to a fourth aspect of an example of the disclosure, an SRS power control apparatus is provided, and includes:

an obtaining unit, configured to obtain indication information reported by a terminal, the indication information being used for indicating power adjustment information, the power adjustment information being used for instructing a network device to adjust actual receiving power of a plurality of different antenna ports, and the plurality of different antenna ports corresponding to different SRS resources of specified antenna switching configurations; and a processing unit, configured to adjust the actual receiving power of the plurality of different antenna ports based on the indication information.

In one implementation, the power adjustment information includes at least one of:

- insertion loss value information of the different antenna ports corresponding to the different SRS resources; or transmission power imbalance issues of the different antenna ports corresponding to the different SRS resources.

In one implementation, the power adjustment information includes the insertion loss value information of the different antenna ports corresponding to the different SRS resources; and the insertion loss value information includes at least one of: a recommended insertion loss value; or an insertion loss value level index, where different insertion loss value level indexes correspond to different insertion loss value ranges.

In one implementation, the power adjustment information includes the transmission power imbalance issues of the different antenna ports corresponding to the different SRS resources; and the transmission power imbalance issues include transmission power imbalance offsets of the different antenna ports corresponding to the different SRS resources.

In one implementation, the power adjustment information includes the insertion loss value information of the different antenna ports corresponding to the different SRS resources, and the transmission power imbalance issues of the different antenna ports corresponding to the different SRS resources; the insertion loss value information includes an insertion loss value level index, where different insertion loss value level indexes correspond to different insertion loss value ranges; and the transmission power imbalance issues include transmission power imbalance offsets of the different antenna ports corresponding to the different SRS resources.

In one implementation, the power adjustment information includes power compensation information, and the power compensation information is obtained by the terminal by calculating, based on an SRS power control rule, transmission power of SRS resources of a plurality of antenna ports with power imbalance of an antenna switching configuration.

In one implementation, the obtaining unit receives the indication information based on a RRC signaling or a MAC-CE.

According to a fifth aspect of an example of the disclosure, an SRS power control apparatus is provided, and includes:

one or more processors, and a memory, configured to store executable instructions of the one or more processors, where the one or more processors are collectively configured to: execute the method described in the first aspect or any implementation of the first aspect.

According to a sixth aspect of an example of the disclosure, an SRS power control apparatus is provided, and includes:

one or more processors, and a memory, configured to store executable instructions of the one or more processors, where the one or more processors are collectively configured to: execute the method described in the second aspect or any implementation of the second aspect.

According to a seventh aspect of an example of the disclosure, a non-transitory storage medium is provided. The storage medium stores instructions, and the instructions in the storage medium, when executed by one or more processors of a terminal, enable the terminal to execute the method described in the first aspect or any implementation of the first aspect.

According to an eighth aspect of an example of the disclosure, a non-transitory storage medium is provided. The storage medium stores instructions, and the instructions in the storage medium, when executed by one or more processors of a network device, enable the network device to execute the method described in the second aspect or any implementation of the second aspect.

The technical solutions provided by the examples of the disclosure may include the following beneficial effects: the terminal reports the indication information indicating power adjustment, so that the network device adjusts the actual receiving power of the plurality of different antenna ports corresponding to the different SRS resources of the antenna switching configurations, to solve problems of SRS coverage and CSI acquisition caused by an unbalanced antenna structure, thus SRS coverage is consistent, CSI is accurately obtained, and performance of a communication system is improved.

It may be further understood that in the disclosure, "plurality of" refers to two or more than two, and other quantifiers are similar. "And/or" describes an association relationship of association objects and represents that there may be three kinds of relationships, for example, A and/or B, may represent three kinds of conditions: A exists alone, A and B exist at the same time, and B exists alone. A character "/" generally represents that the previous and next association objects are in an "or" relationship. The singular forms "a", "the" and "this" are intended to include the plural forms as well, unless the context clearly indicates otherwise.

It may be further understood that the terms "first", "second" and the like are used to describe various information, but these pieces of information need not be limited to these terms. These terms are merely configured to distinguish the same type of information from one another, and do not imply a particular order or a level of importance. In fact, the expressions "first", "second" and the like may be used completely interchangeably. For example, in a case of not departing from the scope of the disclosure, first information may also be called second information, and similarly, the second information may also be called the first information.

It may be further understood that although in the examples of the disclosure, the operations are described in a specific order in the accompanying drawings, it need not be construed as requiring that the operations are executed in the specific order shown or a serial order, or that all the operations shown are executed to obtain desired results. In a certain circumstance, multitasking and parallel processing may be advantageous.

Those of skill in the art will easily figure out other implementation solutions of the disclosure after considering the specification and practicing the invention disclosed here. The present application intends to cover any transformation, usage or adaptive change of the disclosure, and these transformations, usages or adaptive changes conform to a general principle of the disclosure and include common general knowledge or conventional technical means in the technical field not disclosed by the disclosure.

It is to be understood that the disclosure is not limited to the exact structure that has been described above and shown in the accompanying drawings, and various modifications and changes may be made without departing from the scope of the disclosure. The scope of the disclosure is limited merely by the appended claim scope.

The invention claimed is:

1. A method for sounding reference signal (SRS) power control, performed by a terminal, the method comprising:

sending indication information to a network device in response to determining that transmission power of a plurality of different antenna ports is unbalanced, the indication information being used for indicating power adjustment information, the power adjustment information being used for instructing the network device to adjust actual receiving power of the plurality of different antenna ports, the plurality of different antenna ports corresponding to different SRS resources of specified antenna switching configurations, and the different SRS resources corresponding to different numbers of antenna ports;

wherein the power adjustment information comprises insertion loss value information of the plurality of different antenna ports corresponding to the different SRS resources, the insertion loss value information is determined based on an insertion loss value calculated by the terminal, the insertion loss value information comprises an insertion loss value level index, and different insertion loss value level indexes correspond to different insertion loss value ranges.

2. The method according to claim 1, wherein the power adjustment information further comprises:

transmission power imbalance issues of the plurality of different antenna ports corresponding to the different SRS resources.

3. The method according to claim 2, wherein the insertion loss value information further comprises:

a recommended insertion loss value.

4. The method according to claim 2, wherein the transmission power imbalance issues comprise transmission power imbalance offsets of the plurality of different antenna ports corresponding to the different SRS resources.

5. The method according to claim 1, wherein the power adjustment information comprises power compensation information, and the power compensation information is obtained by the terminal by calculating, based on an SRS power control rule, transmission power of SRS resources of a plurality of antenna ports with power imbalance of an antenna switching configuration.

6. The method according to claim 1, wherein sending the indication information to the network device comprises:

sending the indication information to the network device based on Radio Resource Control (RRC) signaling or a Media Access Control (MAC) Control Element (CE).

7. A method for sounding reference signal (SRS) power control, performed by a network device, the method comprising:

obtaining indication information reported by a terminal, the indication information being used for indicating power adjustment information, the power adjustment information being used for instructing the network device to adjust actual receiving power of a plurality of different antenna ports, the plurality of different antenna ports corresponding to different SRS resources of specified antenna switching configurations, and the different SRS resources corresponding to different numbers of antenna ports; and adjusting the actual receiving power of the plurality of different antenna ports based on the indication information;

wherein the power adjustment information comprises insertion loss value information of the plurality of different antenna ports corresponding to the different SRS resources, the insertion loss value information is determined based on an insertion loss value calculated by the terminal, the insertion loss value information comprises an insertion loss value level index, and different insertion loss value level indexes correspond to different insertion loss value ranges.

8. The method according to claim 7, wherein the power adjustment information further comprises:

transmission power imbalance issues of the plurality of different antenna ports corresponding to the different SRS resources.

9. The method according to claim 8, wherein the insertion loss value information further comprises:

a recommended insertion loss value.

10. The method according to claim 8, wherein the transmission power imbalance issues comprise transmission power imbalance offsets of the plurality of different antenna ports corresponding to the different SRS resources.

11. The method according to claim 7, wherein the power adjustment information comprises power compensation information, and the power compensation information is obtained by the terminal by calculating, based on an SRS power control rule, transmission power of SRS resources of a plurality of antenna ports with power imbalance of an antenna switching configuration.

12. The method according to claim 7, wherein obtaining the indication information comprises:

receiving the indication information based on Radio Resource Control (RRC) signaling or a Media Access Control (MAC) Control Element (CE).

13. An apparatus for sounding reference signal (SRS) power control, the apparatus comprising:

one or more processors; and a memory, configured to store executable instructions of the one or more processors, wherein the one or more processors are collectively configured to:

send indication information to a network device in response to determining that transmission power of a plurality of different antenna ports is unbalanced, the indication information being used for indicating power adjustment information, the power adjustment information being used for instructing the network device to adjust actual receiving power of the plurality of different antenna ports, the plurality of different antenna ports corresponding to different SRS resources of specified antenna switching configurations, and the different SRS resources corresponding to different numbers of antenna ports;

wherein the power adjustment information comprises insertion loss value information of the plurality of different antenna ports corresponding to the different SRS resources, the insertion loss value information is determined based on an insertion loss value calculated by the terminal, the insertion loss value information comprises an insertion loss value level index, and different insertion loss value level indexes correspond to different insertion loss value ranges.

14. An apparatus for sounding reference signal (SRS) power control, the apparatus comprising:

one or more processors; and a memory, configured to store executable instructions of the one or more processors, wherein the one or more processors are collectively configured to: execute the method according to claim 7.

15. A non-transitory computer-readable storage medium, storing instructions, wherein the instructions, when executed by one or more processors of a terminal, cause the terminal to execute the method according to claim 1.

16. A non-transitory computer-readable storage medium, storing instructions, wherein the instructions, when executed by one or more processors of network device, cause the network device to execute the method according to claim 7.

* * * * *